United States Patent [19]

Nakasone et al.

[11] Patent Number: 4,725,453
[45] Date of Patent: Feb. 16, 1988

[54] METHOD OF PRODUCTION OF A REINFORCED OPTICAL FIBER

[75] Inventors: Takayoshi Nakasone, Gifu; Yoji Ida, Motosu; Kenji Kozuka, Ichinomiya, all of Japan

[73] Assignee: Ube-Nitto Kasei Co., Ltd., Tokyo, Japan

[21] Appl. No.: 809,878

[22] Filed: Dec. 17, 1985

[30] Foreign Application Priority Data

Dec. 19, 1984 [JP] Japan ................... 59-266395

[51] Int. Cl.$^4$ .............. G02B 6/44; B05D 5/06
[52] U.S. Cl. ................... 427/163; 350/96.23;
350/96.34; 427/389.7; 427/407.2
[58] Field of Search ........... 350/96.23, 96.29, 96.30,
350/96.34; 427/163, 385.5, 389.7, 407.1, 407.2;
428/394, 407

[56] References Cited

U.S. PATENT DOCUMENTS

| 4,113,349 | 9/1978 | Stiles | 350/96.23 |
| 4,505,541 | 3/1985 | Considine et al. | 350/96.23 |
| 4,629,286 | 12/1986 | Fuse et al. | 350/96.23 |

FOREIGN PATENT DOCUMENTS

| 58-105106 | 6/1983 | Japan | 350/96.23 |
| 2078996 | 1/1982 | United Kingdom | 350/96.23 |
| 2096343 | 10/1982 | United Kingdom | 350/96.23 |

*Primary Examiner*—John Lee
*Attorney, Agent, or Firm*—Wenderoth, Lind & Ponack

[57] ABSTRACT

A reinforced optical fiber includes a reinforcing inner layer interposed between a buffer layer of silicon rubber and a FRP layer made of styrene resin and fibers. The reinforcing inner layer is formed by binding filaments attached longitudinally onto the buffer layer with a non-styrene resin. The additional reinforcing inner layer improves crushing resistance and also keeps low an increase of transmission loss. The reinforcing inner layer directly covering the buffer layer is formed by the steps of longitudinally attaching dry filaments to the buffer layer and then impregnating the filaments with a curable resin.

2 Claims, 2 Drawing Figures

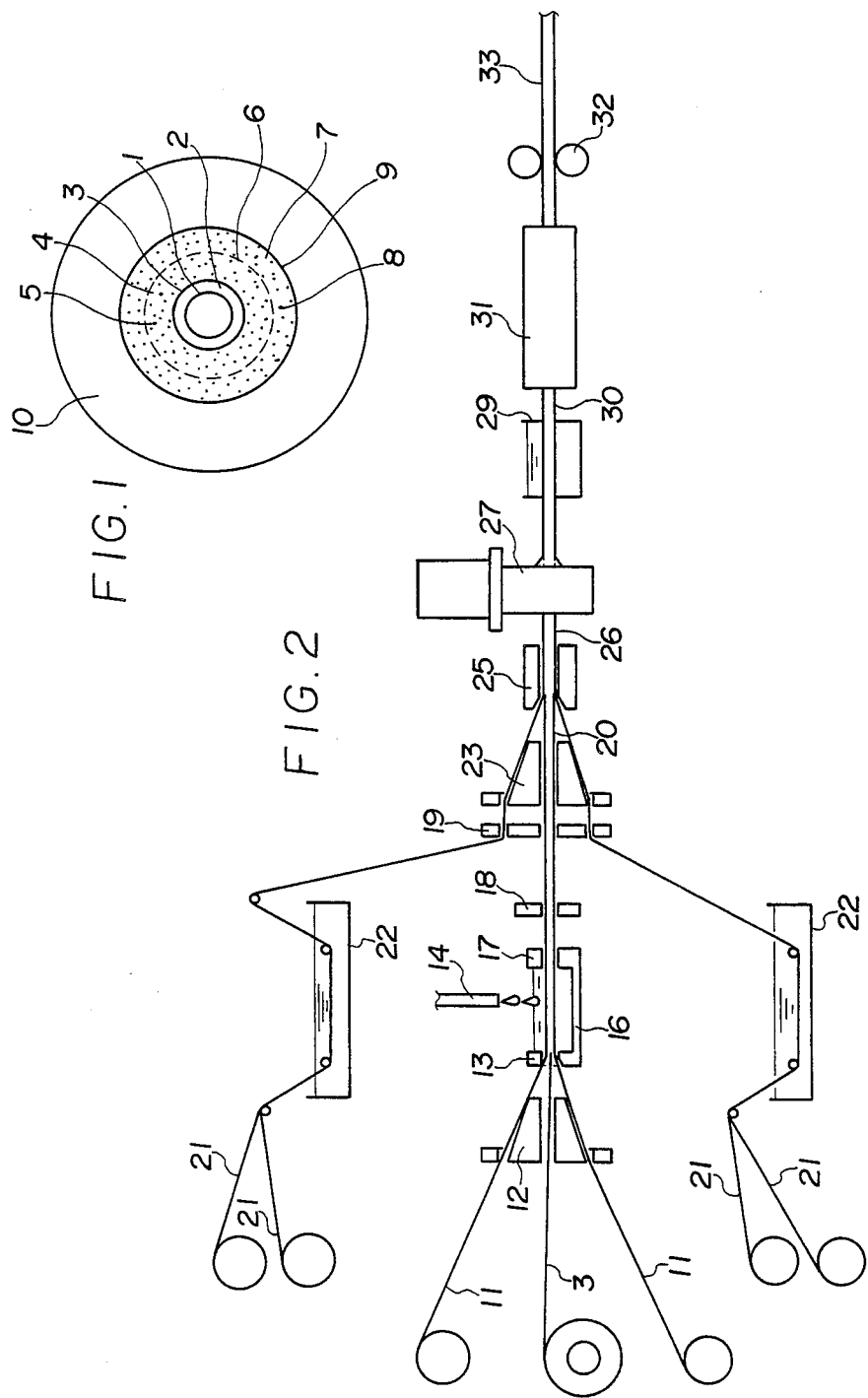

METHOD OF PRODUCTION OF A REINFORCED OPTICAL FIBER

BACKGROUND OF THE INVENTION

The present invention relates to a method of producing a single-core cord of reinforced optical fiber having a new structure.

A single-cord cord of optical fiber has such a basic structure that the core and clad made of quartz glass or the like are covered with a buffer layer as the primary coating and a reinforcing layer as the secondary coating formed on the buffer layer.

The buffer layer is usually made of silicone rubber and the secondary coating is made of nylon or FRP (fiber-reinforced thermosetting resin). The resin matrix of FRP is usually an unsaturated polyester containing general-purpose styrene polymer on account of its ease of use and its low price. It was however found by experiments made by the present inventors that styrene monomer, during the manufacturing process of the cord, migrates into the buffer layer of silicone rubber to swell it and cross-links in the buffer layer to make it turbid. Thus styrene has the possibility of impairing the buffering function of silicone rubber.

The present invention was completed to solve the above-mentioned problem. Accordingly, it is an object of the invention to provide a method of producing a single-cord of reinforced optical fiber having a new structure. Particularly, an object of the invention is to provide a method of producing single-core cord of reinforced optical fiber in which a buffer layer may be protected from becoming turbid and from losing its buffering function, thereby reducing transmission loss.

Another object of the invention is to provide a method of producing a reinforced optical fiber having an increased strength.

SUMMARY OF THE INVENTION

According to the invention, there is produced a single-core cord of reinforced optical fiber which comprises an optical fiber element including an optical fiber and a primary coating formed of silicone rubber and covering the optical fiber, and a secondary coating covering the optical fiber element. The secondary coating has a three-layer structure which comprises a reinforcing inner layer formed of longitudinally arranged reinforcing fibers and cured non-styrene resin binder, a reinforcing outer layer formed of fiber-reinforced cured styrene resin and a surface layer formed of thermoplastic resin. The reinforcing outer layer and the surface layer are intimately bonded together with an anchoring effect therebetween.

Preferably, the non-styrene resin binder in the inner layer is formed by cross-linking a high-boiling non-styrene monomer with an unsaturated alkyd resin. The non-styrene monomer may be selected from a group comprising allyl compounds such as diallyl phthalate and triallyl phthalate, and methacrylic acid and methacrylates such as methyl methacrylate, butyl methacrylate, hexyl methacrylate, ethylene dimethacrylate, 2-hydroxyethyl methacrylate, and glycidyl methacrylate.

A method according to the invention for producing a single-core cord of reinforced optical fiber starts with providing an optical fiber element by covering an optical fiber with a primary coating of silicone rubber. Reinforcing fibers are arranged longitudinally along the axis of the optical fiber element and are then impregnated with a curable resin material containing non-styrene monomer, the resultant product being passed through a squeezing die to form a non-cured inner layer. The inner layer is covered with a layer composed of reinforcing fibers and a curable resin material containing styrene monomer, which layer forms a non-cured outer layer after passing through a squeezing die. The outer layer is then covered with a molten thermoplastic resin to a predetermined diameter to form a surface layer after a subsequent solidification. Thereafter, the resultant product is heated to harden the curable resin material in the inner and outer layers, thereby forming a secondary coating having a three-layer structure.

Other objects, features and advantages of the present invention will be apparent from the following detailed description of preferred embodiments thereof when taken in conjunction with the accompanying drawings, in which:

BRIEF DESCRIPTION OF THE DRAWINGS

FIG. 1 is a schematic representaiton of an example of the structure of a reinforced optical fiber of this invention; and FIG. 2 is a schematic representation of an apparatus for carrying out the method according to this invention for producing the reinforced optical fiber.

DETAILED DESCRIPTION OF THE INVENTION

A single-core cord of optical fiber of the invention includes a primary coating of silicone rubber covering an optical fiber and a secondary coating formed on the primary coating. The secondary coating has a three-layer structure comprising a reinforcing inner layer which is composed of longitudinally arranged fibers and cured non-styrene resin binder, a reinforcing outer layer of fiber-reinforced cured styrene resin and a surface layer of thermoplastic resin. The outer layer and the surface layer are intimately bonded together with an anchoring effect. A feature of the structure resides in that the reinforcing inner layer is interposed between the primary coating or buffer layer of silicon rubber and the FRP layer made of styrene resin and fibers. The reinforcing inner layer is formed by binding filaments attached longitudinally to the buffer layer with the non-styrene resin. Not only does the additional reinforcing inner layer improve crushing resistance, but also it keeps low an increase of transmission loss.

A method of the invention comprises the following steps. First, reinforcing fiers are longitudinally arranged on a primary coating or buffer layer of silicone rubber which covers an optical fiber, and are then impregnated with a curable resin material, typically thermosetting resin, containing non-styrene monomer. The optical fiber thus coated is passed through a narrow squeezing die. It is further covered with a layer composed of reinforcing fibers and curable resin material containing styrene monomers and is passed through a squeezing die of predetermined diameter. This FRP layer is then covered with a molten thermoplastic resin which is in turn cooled. Thereafter, the product is heated to harden the curable resin materials, thereby forming the secondary layer of laminated structure. A feature of the method resides in that the reinforcing inner layer directly covering the buffer layer is formed by the steps of longitudinally attaching dry filaments to the buffer layer and then impregnating the filaments with the curable resin.

If it was only necessary to protect the buffer layer of silicone rubber from the migration of styrene monomer, this would be achieved by simply providing an inner layer made of non-styrene resin that will check the migration. However, this has a disadvantage that the resin shrinks upon curing, applying side pressure to the buffer layer, with the result that the transmission loss of the optical fiber reaches about 0.3 dB/km. This disadvantage can be overcome when the reinforcing inner layer is formed by attaching filaments longitudinally to the buffer layer and then impregnating them with non-styrene resin.

Also, if a non-styrene resin layer (without reinforcement) would be merely interposed between the buffer layer of silicone rubber and the RFP layer of styrene resin matrix, the product would have insufficient crushing resistance because the roving filaments surrounding the optical fiber longitudinally would not be uniformly distributed. A better result is obtained when the FRP layer is doubled.

According to the method of this invention, dry filaments (not impregnated) are attached longitudinally to the buffer layer and the resulting assembly is passed through a resin vessel in a short time and then through a squeezing die to form a thin layer. This method is advantageous over the conventional one in which previously impregnated filaments are longitudinally attached to the buffer layer and then the resulting assembly is passed thorugh a squeezing die. The disadvantages of the conventional method are that the filaments are often broken during squeezing and the resin matrix is densified near the surface of the silicone rubber layer by squeezing. The densified resin shrinks upon curing to apply side pressure to the optical fiber element, thus increasing the transmission loss.

EXAMPLES

The preferred embodiment sof the invention are described with reference to the accompanying FIG. 1 and FIG. 2. Referring to FIG. 2, there is indicated at 3 an optical fiber element made up of an optical fiber of quartz glass (50 μm in core diameter and 125 μm in clad diameter) and a 400 μm thick buffer layer of silicone rubber covering the optical fiber. Reference numeral 11 indicates a reinforcing glass fiber bundle of 80 Tex composed of a number of monofilaments each of about 10 μm in diameter. As the optical fiber element is fed from the center bobbin shown at the left end in FIG. 2, the reinforcing glass fiber bundles 11 are also fed from four bobbins and converge through a guide 12 so that they are attached longitudinally to the optical fiber element. The assembly of the optical fiber element and reinforcing glass fibers is compacted into a strand 0.70 mm in diameter by a guide 13 at the entrance of a resin vessel 16. The strand is passed through the resin vessel 16 being supplied from a pipe 14 with unsaturated polyester resin material ("XE" made by Mitsui Qoatsu Chemicals, Inc.) containing non-styrene monomers. The reinforcing fiber layer is impregnated with the resin having a viscosity of 8 poise. On passing through an exit guide 17, the impregnated strand is squeezed into a diameter of 0.9 mm. The impregnated strand passes further through a proper number of squeeze guides 18, each having a proper inside diameter, and through a center nozzle of a guide 23. At this stage, the optical fiber element is covered with an uncured composite material 20 of 0.7 mm diameter which will become the reinforcing inner layer.

The uncured composite material 20 is covered longitudinally with a composite material composed of glass fiber filaments about 10 μm in diameter and unsaturated polyester resin ("Ester" made by Mitsui Qoatsu Chemicals, Inc.) containing styrene monomers. The glass fiber filaments, supplied in the form of four rovings 21 each 160 Tex, are impregnated with the unsaturated polyester resin in vessels 22, followed by squeezing by outer holes of guides 19 and 23. The reinforcing layer thus formed on the material 20 is squeezed into a diameter of aobut 1 mm by a squeezing nozzle 25 to thereby obtain a rod-like mold 26 the outer most portion of which will become a reinforcing outer layer.

The mold 26 is passed through a cross-head die 27 for extrusion coating with linear low-density polyethylene ("GRSN-7047" made by Nippon Unicar Co., Ltd.) in the molten state. The coated thermoplastic is solidified in a subsequent cooling stage by passing through a tank 29. A rod-like semi-product 30 from the tank 29 is not yet cured. It is introduced into a curing chamber 31 heated to 140° C. with steam at 3.7 kg/cm² to harden the thermosetting resin in the inner and outer reinforcing layers. It is to be noted that during the hardening process with heat and pressure the thermoplastic resin around the outer layer is plasticized so that the FRP outer layer and the thermoplastic surface layer are intimately bonded together with an anchoring effect. After hardening, there is obtained a reinforced optical fiber 33, which is advanced by a roller apparatus 32 and wound up on a drum (not shown).

The reinforced optical fiber thus obtained has a structure as shown in FIG. 1. It comprises the optical fiber 1, the buffer layer 2 of silicone rubber of about 0.4 mm in diameter, the reinforcing inner layer 6 of about 0.7 mm in diameter, the reinforcing outer layer 9 of about 1.0 mm in diameter, and the surface layer 10 of about 1.8 mm in diameter. The reinforcing inner layer 6 is composed of glass filaments 5 longitudinally attached to the buffer layer and bound with the resin 4 containing non-styrene monomers. The reinforcing outer layer 9 is composed of glass filaments 8 and the resin 7 containing styrene monomers. The reinforcing outer layer and the low-density polyethylene surface layer 10 are intimately bonded together with the anchoring effect and the tensile shear strength at the interfaace was found to be about 50 kg/cm².

Several tests were conducted by the inventors to find that the reinforced optical fiber obtained in the above example increased the transmission loss by only 0 to 0.1 dB/km at a wavelength of 0.85 μm and that it had a crushing strength of 150 to 160 kg at a compression rate of 1 mm/min. (Pressure was applied over 50 mm of an 80 mm long sample.)

The production in the example was performed in a stable manner without breakage, slackening, or fuzzing of the glass fiber. The reinforced optical fiber produced was 2000 meters long.

For comparison, the same optical fiber as used in the example was made into a reinforced optical fiber in the manner as explained below. The optical fiber element was coated with a non-styrene resin alone to form a 25 μm thick inner layer, in place of the reinforcing inner layer 6. The inner layer was covered with six pieces of glass fiber rovings (160 Tex) in the longitudinal direction, followed by impregnation with the same resin material as used for the reinforcing outer layer 9 in the example. After squeezing, coating with linear low-density polyethylene, and hardening in the same manner as in the example, there was obtained a 1.8 mm diameter reinforced optical fiber which had a reinforcing layer containing about 58 vol % of glass fibers. The increase in transmission loss was 0.3 dB/km and the crushing strength was 130 kg when measured in the same manner as mentioned above.

The above-mentioned preferred embodiment should not be construed as limiting the scope of the invention. For example, the reinforcing fiber in the inner layer and outer layer may be glass fiber, ceramic fiber, carbon fiber, aromatic polyamide, polyester fiber, vinylon fiber or other suitable fibers. Different fibers may be used for the respective reinforcing layers. The fiber bundle for the reinforcing inner layer should preferably be small diametered and have a small number of filaments. This is desirable for uniform distribution in the layer and also for less increase in transmission loss due to microbending. The binder resin for the reinforcing inner layer should preferably be one which is formed by cross-linking a high-boiling non-styrene monomer with an unsaturated alkyd resin. Examples of such a high-boiling monomer include allyl compounds such as diallyl phthalate and triallyl phthalate, and methacrylic acid and methacrylates such as methyl methacrylate, buty methacrylate, hexyl methacrylate, ethylene dimethacrylate, 2-hydroxyethyl methacrylate, and glycidyl methacrylate.

The resin for the reinforcing outer layer may be unsaturated polyester resin or epoxy resin; and the thermoplastic resin for the surface layer may be high-or low-density polyethylene or copolymer thereof, polypropylene or copolymer thereof, nylon, ABS resin, or fluorocarbon resin. They are not limitative and any other resins capable of melt extrusion coating may be selected according to their performance.

In the production of the reinforced optical fiber of this invention, the optical fiber element is covered with reinforcing fiber bundles arranged longitudinally. The number of bundles is determined according to the desired fiber content in the hardened inner layer and the Tex of bundles used. For uniform distribution, it is desirable to use at least four bundles of small Tex as described above. The use of guides should be minimal to prevent dry fibers from breaking or fuzzing.

When the reinforcing inner layer is formed on the optical fiber element, the reinforcing fiber bundle should be longitudinally attached to the optical fiber element in such a manner that the element is placed at the center of the dry fiber layer and the diameter of the dry fiber layer is equal to the final diameter attained after impregnation and squeezing so that the fibers are prevented from moving with respect to the optical fiber element. The longitudinally attached fibers should be impregnated with a resin material having a low viscosity, say 20 poise or below at 25° C. For impregnation, the optical fiber element covered with reinforcing fibers is passed through a resin vessel, followed by squeezing by a guide. This permits the resin material to permeate the fibers from outside to inside. During the hardening process, heat is applied to the semi-product 30 with a temperature close to a melting point of the thermoplastic surface layer. In this heating step, the thermoplastic resin of the surface layer comes into close contact in the molten state with the uncured resin constituting the reinforcing outer layer. This is promoted by the curing heat generated by the thermosetting resin. Under pressure in the radial direction at a high temperature, the two layers are intimately bonded together with the anchoring effect.

The final product thus formed may be passed through a finishing die prior to winding up in order to accurately control the diameter of the surface layer.

The effect of the present invention is summarized below. The reinforced optical fiber of this invention is constructed such that an optical fiber element having a buffer layer of silicone rubber is covered with the reinforcing inner layer composed of longitudinally arranged fibers and a non-styrene binder resin which is inert to the buffer layer. Therefore, the buffer layer is protected from becoming turbid and losing its buffering function due to the deterioration of mechanical characteristics. This leads to a minimum increase in tranmsission loss. The reinforcing inner layer and the reinforcing outer layer are integrally bonded at their interface. The double-layer reinforcing structure improves crushing strength because a defect in one layer is corrected by the other. (The commonest defect is uneven distribution of fiber bundles in each layer. The fiber density tends to be low at the boundaries of the bundles. Such a low-density part, however, will not lie on top of another in the case of the double-layer structure.) The surface layer and the reinforcing outer layer which are intimately bonded or anchored together protect the optical fiber from external stress.

The above mentioned structure reduces the side pressure on the buffer layer resulting from the shrinkage of resin. This suppresses the increase in transmission loss. A possible reason for this is considered as follows: The optical fiber element is covered at first with longitudinally arranged fibers and then the fibers are impregnated with a curable resin material containing non-styrene monomers. As a result of this process, there are more fibers and less resin in the vicinity of the buffer layer and the shrinkage of resin due to curing is suppressed by the fibers.

The method of this invention is free of such troubles as fuzzing, slackening, and breaking of reinforcing fibers, which are involved in the conventional method in which thin glass fibers impregnated with an uncured resin are longitudinally attached to the optical fiber element. The method of this invention provides the reinforcing layers made up of uniformly distributed fine fiber bundles.

An additional advantage of this invention is that the reinforcing inner layer is made of non-styrene type unsaturated polyester resin and the reinforcing outer layer is made of low-priced general-purpose thermosetting resin. This leads to a reduction of the cost of the reinforced optical fiber.

Although the present invention has been described with reference to the preferred embodiments thereof, many modifications and alterations may be made within the spirit of the invention.

What is claimed is:

1. A method for producing a single-core cord of reinforced optical fiber comprising the steps of:
   providing an optical fiber element by covering an optical fiber with a primary coating of silicone rubber;
   arranging reinforcing fibers longitudinally around said optical fiber element;
   impregnating said reinforcing fibers with a curable resin material containing non-styrene monomer;
   passing the resultant product through a squeezing die to form a non-cured inner layer;

covering said inner layer with a layer composed of reinforcing fibers and a curable resin material containing styrene monomer;

passing the resultant product through a squeezing die to form a non-cured outer layer;

covering said outer layer with a molten thermoplastic resin to a predetermined diameter;

cooling and solidifying said thermoplastic resin to form a surface layer; and heating the resultant product to harden said curable resin material in said inner layer and said outer layer, thereby forming a secondary coating having a three-layer structure.

2. A method as claimed in claim 1, wherein the heating step for hardening said curable resin material comprises applying under pressure heat with a temperature close to a melting point of said thermoplastic resin.

* * * * *